US010393428B2

(12) United States Patent
Bernhardt et al.

(10) Patent No.: US 10,393,428 B2
(45) Date of Patent: Aug. 27, 2019

(54) DEVICE AND METHOD FOR COOLING AND/OR LOW-TEMPERATURE LIQUEFACTION

(71) Applicant: L'Air Liquide, Societe Anonyme pour l'Etude et l'Exploitation des Procedes Georges Claude, Paris (FR)

(72) Inventors: Jean-Marc Bernhardt, La Buisse (FR); Fabien Durand, Voreppe (FR)

(73) Assignee: L'Air Liquide Societe Anonyme Pour L'Etude Et L'Exploitation Des Procedes Georges Claude, Paris (FR)

(*) Notice: Subject to any disclaimer, the term of this patent is extended or adjusted under 35 U.S.C. 154(b) by 591 days.

(21) Appl. No.: 15/102,123

(22) PCT Filed: Nov. 6, 2014

(86) PCT No.: PCT/FR2014/052838
§ 371 (c)(1),
(2) Date: Jun. 6, 2016

(87) PCT Pub. No.: WO2015/082789
PCT Pub. Date: Jun. 11, 2015

(65) Prior Publication Data
US 2016/0305708 A1    Oct. 20, 2016

(30) Foreign Application Priority Data
Dec. 6, 2013  (FR) ...................................... 13 62233

(51) Int. Cl.
*F25J 1/00*     (2006.01)
*F04D 25/16*   (2006.01)
(Continued)

(52) U.S. Cl.
CPC ............ *F25J 1/0007* (2013.01); *F04D 17/10* (2013.01); *F04D 25/163* (2013.01);
(Continued)

(58) Field of Classification Search
CPC ........ F04D 25/163; F04D 17/10; F25B 1/047; F25B 1/10; F25B 31/004; F25J 1/0007;
(Continued)

(56) References Cited

U.S. PATENT DOCUMENTS 2,563,744 A * 8/1951 Price ..................... B64C 21/025
416/95
3,909,012 A * 9/1975 Denis ...................... F01D 11/04
277/432
(Continued)

FOREIGN PATENT DOCUMENTS

EP    0 411 294    2/1991
FR    2 919 716    2/2009
(Continued)

OTHER PUBLICATIONS

International Search Report and Written Opinion for PCT/FR2014/052838, dated Jan. 21, 2015.
(Continued)

*Primary Examiner* — Keith M Raymond
*Assistant Examiner* — Webeshet Mengesha
(74) *Attorney, Agent, or Firm* — Christopher J. Cronin

(57) ABSTRACT

The invention relates to a device for cooling and/or liquefying, at a low-temperature, a working fluid containing helium or consisting of pure helium. The device includes a working circuit provided with a compressor station and a cold box. The compressor station includes one or more compression stages, each using one or more compressors that include a compressor wheel rigidly connected to an axle that is rotatably mounted on bearings. The axle of each compressor is rotated by an output shaft of a motor via a gear mechanism placed in a mechanical housing including lubricating oil. Said device is characterized in that the inner space of the mechanical housing contains a gaseous atmosphere consisting of a gaseous mixture having a mean molar mass that smaller than the molar mass of the air.

12 Claims, 2 Drawing Sheets

(51) Int. Cl.
*F25B 1/047* (2006.01)
*F25B 1/10* (2006.01)
*F25B 31/00* (2006.01)
*F16H 57/04* (2010.01)
*F04D 17/10* (2006.01)
*F25J 1/02* (2006.01)

(52) U.S. Cl.
CPC ......... *F16H 57/0413* (2013.01); *F25B 1/047* (2013.01); *F25B 1/10* (2013.01); *F25B 31/004* (2013.01); *F25J 1/0065* (2013.01); *F25J 1/025* (2013.01); *F25J 1/0279* (2013.01); *F25J 2230/20* (2013.01); *F25J 2270/912* (2013.01)

(58) Field of Classification Search
CPC .......... F25J 1/0065; F25J 1/025; F25J 1/0279; F25J 2270/912
See application file for complete search history.

(56) References Cited

U.S. PATENT DOCUMENTS 4,464,908 A * 8/1984 Landerman ............... F02C 1/05
  62/235.1
4,495,035 A * 1/1985 Swearingen ............. B01D 3/34
  203/2
2002/0141861 A1 * 10/2002 Czechowski ......... F04D 25/163
  415/60
2010/0263405 A1 * 10/2010 Durand ..................... F25B 1/10
  62/510
2012/0279239 A1 * 11/2012 Bernhardt ............... F25B 9/002
  62/115
2013/0000332 A1 * 1/2013 Aigouy ..................... F25B 9/00
  62/126
2013/0014518 A1 * 1/2013 Aigouy ..................... F25B 9/00
  62/6
2013/0291585 A1 * 11/2013 Bernhardt ............... F25J 1/0007
  62/608
2013/0341934 A1 * 12/2013 Kawanishi ............... B60L 8/00
  290/1 A
2014/0157750 A1 * 6/2014 Landi ..................... F01D 25/16
  60/39.08

FOREIGN PATENT DOCUMENTS

FR        2 953 913       6/2011
GB          689 615       4/1953
WO    WO 96 15392       5/1996

OTHER PUBLICATIONS

French Search Report and Written Opinion for FR 1 362 233, dated Apr. 2, 2014.

* cited by examiner

DEVICE AND METHOD FOR COOLING AND/OR LOW-TEMPERATURE LIQUEFACTION

CROSS-REFERENCE TO RELATED APPLICATIONS

This application is a § 371 of International PCT Application PCT/FR2014/052838, filed Nov. 6, 2014, which claims § 119(a) foreign priority to French patent application FR 1 362 233, filed Dec. 6, 2013.

BACKGROUND

Field of the Invention

The present invention relates to a device and a method for low-temperature liquefaction/cooling.

The invention may notably be concerned with a liquefaction method and device and a refrigeration method and device operating on helium.

The invention relates more specifically to a device for the low-temperature liquefaction and/or cooling of a working fluid comprising helium or consisting of pure helium, the device comprising a working circuit provided with a compression station and with a cold box, the compression station comprising one or more compression stages each using one or more compressors comprising a compressor impeller secured to a spindle mounted so that it can rotate on bearings, the spindle of each compressor being rotationally driven by an output shaft of a motor via a gear mechanism housed in a mechanical gearbox containing lubricating oil.

Related Art

Refrigerators or liquefiers operating at low temperature (for example below 80K, notably between 80K and 4K) conventionally use a working fluid (for example helium or a mixture containing helium) subjected to a working cycle that comprises a compression, possibly an expansion, a cooling, a heating. These devices in general require several stages for compressing the working gas. Each compression stage uses one or more compressor impellers. For example, these devices use compressors of the centrifugal type.

The compression stations that compress helium (or mixture containing helium) require a large number of compression stages in order to compensate for the low compression ratio of each stage (cf. for example FR2919716A1).

In particular, each compressor shaft must also rotate at a relatively high speed in order to ensure good compression efficiency.

The overall efficiency of a multistage compressor is dependent on a number of criteria and notably on:
  the efficiency of the compression impellers and volutes (to increase the compression ratio),
  the efficiency of the inter-stage cooling (to limit the pressure drop across the system),
  the mechanical losses (notably caused by friction between moving parts).

Leaks of working gas in the compression station at the interface between the rotating parts and the fixed parts are unavoidable. Particularly when the working gas is helium, relatively significant leaks of gas occur at the bearings supporting the shafts of the compressor impellers. In order to limit this loss of relatively expensive working gas, it is known practice to limit the leak at each bearing of each compression stage using components such as packings that form labyrinths against the gas, oil seals, floating ring seals, gas seals, etc.

Aside from the fact that these devices increase the cost of the installation, these known systems are not always suited to cooler/liquefier technology.

In addition, the oil present in the mechanism of the compression station must not contaminate the working gas (by mixing with the helium or by bringing in moisture and/or light hydrocarbons). Specifically, such impurities introduced into the working circuit carry the risk of causing plugging at cryogenic temperatures and of breaking the equipment.

Thus, such devices may optionally comprise recuperation systems for recovering potential leaks of helium as described for example in document FR2953913A1. According to that document, a buffer gas may be injected to collect the helium leaks.

The fluid tightness of a helium centrifugal compressor therefore employs technology that involves isolating the parts containing the lubricating oil by using a buffer gas (nitrogen). Buffering with gaseous helium is planned in order to avoid any leak of nitrogen into the working gas (helium).

This technology offers advantages but is the source of significant cost because this sealing system needs to be installed on each stage of the compressor.

SUMMARY OF THE INVENTION

It is an object of the present invention to alleviate all or some of the disadvantages of the prior art as recalled hereinabove.

To this end, the device according to the invention, in other respects in accordance with the generic definition given thereof in the above preamble, is essentially characterized in that the internal volume of the mechanical gearbox contains a gaseous atmosphere consisting of a gaseous mixture having a mean molar mass lower than the molar mass of air.

Moreover, some embodiments of the invention may include one or more of the following features:
  the gaseous atmosphere of inside the mechanical gearbox comprises a molar proportion of helium that is greater than the (molar) proportion of helium in the air,
  the gaseous atmosphere of inside the mechanical gearbox comprises a molar proportion of helium comprised between 5% and 100%,
  the gaseous atmosphere of inside the mechanical gearbox comprises a predominant molar proportion of helium,
  the gaseous atmosphere of inside the mechanical gearbox comprises helium and at least one of the following gases: nitrogen, argon, one or more components of the working fluid,
  the device comprises a member for injecting a buffer gas at least at one bearing of the compressor or compressors to form a gas barrier guiding leaks of working fluid from the working circuit toward a collection zone, at least part of the collection zone comprises the mechanical gearbox, which means to say that the buffer gas containing recovered leaked helium is fed into the internal volume of the mechanical gearbox,
  the device comprises a member for purifying the internal atmosphere of the motor gearbox connected to said motor gearbox via a first pipe for tapping a mixture of gas and oil from the gearbox and a second pipe for returning purified oil, the purification member comprising an outlet for the recuperation of working gas recuperated during the purification, the device comprises a member for compressing the mixture tapped off by the tapping pipe so as to supply the purification member with a mixture compressed to a determined pressure, the member for compressing the mixture of gas and oil from the internal atmosphere of the gearbox comprises an oil-lubricated mechanism the oil of which is identical to or of the same kind as the lubricating oil of the mechanical gearbox, the purification member being common to both so as to purify the lubricating oil of the mechanical gearbox and the oil of the member for compressing the mixture tapped off by the tapping pipe, at least some of the compressors of the compression station are compressors of the centrifugal type, the buffer gas comprises at least one of the following: helium, nitrogen, one or more component of the working fluid, the mechanical gearbox is sealed, the compression member that compresses the mixture of gas and of oil from the internal atmosphere of the gearbox comprises a compressor of the lubricated-screw compressor type, the working circuit subjects the working gas to a cycle comprising in series: a compression of the working fluid in the compression station, a cooling and possibly an expansion of the working fluid in the cold box, and a heating of the working fluid in order to return it to the compression station.

The invention also relates to a method for the low-temperature liquefaction and/or cooling of a working fluid, in particular a working fluid comprising helium or consisting of pure helium, by means of a refrigerator/liquefier comprising a working circuit provided with a compression station and with a cold box, the refrigerator/liquefier subjecting the working gas in the working circuit to a cycle comprising in series: a compression of the working fluid in the compression station, a cooling in the cold box, and a heating of the working fluid in order to return it to the compression station, the compression station comprising one or more compression stages each using one or more compressors comprising a compressor impeller secured to a spindle mounted so that it can rotate on bearings, the spindle of each compressor being rotationally driven by an output shaft of a motor via a gear mechanism housed in a mechanical gearbox containing lubricating oil, the gaseous atmosphere inside the internal volume of the mechanical gearbox being controlled so as to contain a gaseous mixture having a mean molar mass that is lower than the molar mass of air.

According to other possible specific features:

the method comprises a step of injecting a buffer gas at least at one bearing of the compressor or compressors to form a gas barrier guiding leaks of working fluid from the working circuit toward a collection zone, the internal volume of the gearbox being supplied with a mixture of buffer gas and collected leaked helium, the method comprises a step of purifying the internal atmosphere of the gearbox in order to separate the working gas and the oil and reinject the purified oil into the gearbox, the method comprises a step of compressing the mixture of gas and oil of the atmosphere prior to the purification step, the step of compressing the mixture of gas and of oil from the internal atmosphere of the gearbox uses an oil-lubricated mechanism of which the oil is identical to or the same nature as the lubricating oil of the mechanical gearbox, the step of purifying the internal atmosphere of the mechanical gearbox being common to a step of purifying the oil of the compression member that compresses the mixture upstream of the purification step.

The invention may also relate to any alternative device or method comprising any combination of the features above or below.

Further specifics and advantages will become apparent from reading the description hereinbelow which is given with reference to the figures in which:

DETAILED DESCRIPTION OF THE INVENTION

Figure 1:
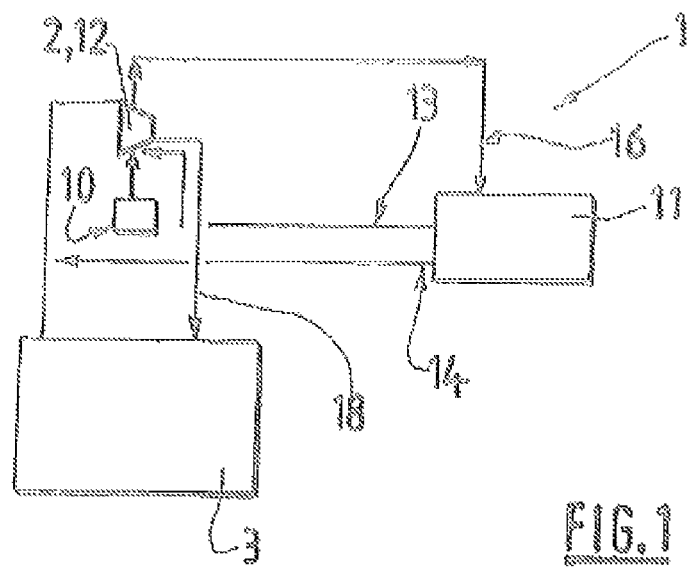
FIG. 1 depicts a schematic and partial view illustrating the structure and operation of one exemplary embodiment of a refrigeration and/or liquefaction device according to the invention.

The cooling and/or liquefaction device depicted partially and schematically in FIG. 1 operates at cryogenic temperatures, for example of between 4K and 80K. This device preferably contains a working gas containing helium or consisting of pure helium. The device 1 conventionally comprises a working circuit provided with a compression station 2 and a cold box 3.

The working circuit 18 subjects the working gas to a cycle comprising, in series: a compression of the working fluid in the compression station 2, a cooling (and possibly an expansion) of the working fluid in the cold box 3 and a heating of the working fluid so that it can be returned to the compression station 2.

The compression station 2 comprises one or more compression stages, each one using one or more compressors 12.

Figure 2:
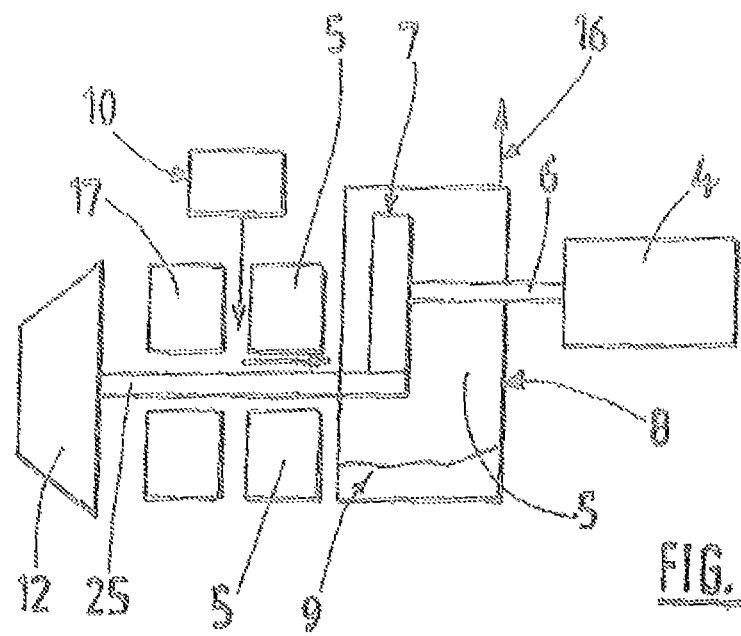
FIG. 2 depicts a schematic and partial view in longitudinal section illustrating one example of a compressor impeller mounted on bearings comprising a drive mechanism according to the invention.

As illustrated schematically in FIG. 2, each compressor impeller 12 is secured to a spindle 25 mounted to rotate on bearings 5. A seal 17 is positioned notably at one end of the spindle 25.

The spindle 25 of each compressor 12 is conventionally driven in rotation by an output shaft 6 of a motor 4 via a gear mechanism 7 (notably a speed multiplier system) housed in a mechanical gearbox 8.

Figure 3:
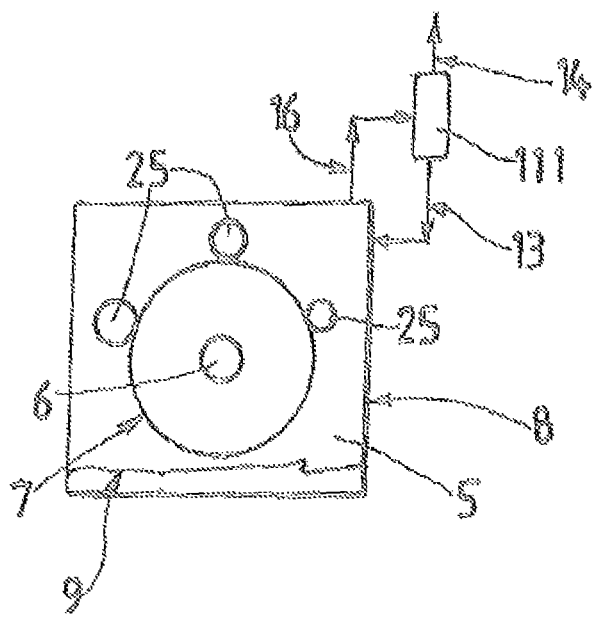
FIG. 3 depicts a schematic and partial front view of one end of the mechanism of FIG. 3, illustrating how a plurality of compressor spindles is driven by the motor.

As can be seen in FIG. 3, the output shaft 6 of the motor can drive several compressor 12 spindles 25 off at least one gear wheel 7.

The mechanical gearbox 8 is enclosed and contains an oily atmosphere and, for example, a lubricating oil bath 9 set in motion by the mechanical moving parts.

According to one advantageous feature, the internal volume of the mechanical gearbox 8 contains a gaseous atmosphere consisting of a gaseous mixture having a mean molar mass that is lower than the molar mass of air. What that means to say is that, instead of providing an atmosphere of air or of nitrogen in this gearbox 8, provision is made for the internal gas atmosphere to have a molar mass that is lower than air or nitrogen. For example, the inside of the gearbox contains a determined proportion of helium.

For preference, the gaseous environment inside the mechanical gearbox 8 contains helium and possibly at least one of the following gases: nitrogen, argon, one or more component of the working fluid. The gaseous atmosphere inside the mechanical gearbox 8 for example comprises a molar proportion of helium that is higher than the proportion of helium in air. For preference, the gaseous atmosphere of the inside of the mechanical gearbox 8 comprises a predominant molar proportion of helium, possibly supplemented by at least one of the following: nitrogen, argon, air, one or more component of the working fluid.

This gaseous atmosphere makes it possible to greatly reduce the contribution of the mechanical losses of the compressor and thus improve the efficiency of the device. Specifically, friction between moving parts (spindles, gears, gear sets, etc.) is reduced in an atmosphere of gas having a relatively lower molar mass. The higher the speed at which the mechanical moving parts are moving, the greater this reduction in friction is.

A source of low molar mass gas can be provided in order to sustain this atmosphere within the gearbox 8. One or more sensors may be provided to monitor this atmosphere and regulate its composition if need be.

For preference, the mechanical gearbox 8 is therefore sealed.

As illustrated in FIGS. 1 and 2, the device 1 may optionally comprise a member 10 for injecting a buffer gas at least at one bearing 5 of the compressor or compressors 12 in order to form a gas barrier guiding leaks of working fluid coming from the working circuit toward a collection zone.

In addition, advantageously and although this is not necessary, the mixture of buffer gas and of working gas recovered can be used to feed the inside of the mechanical gearbox 8 (in order to form the atmosphere of low molar mass).

Indeed, in such a case, if helium is already present in the working gas, it is advantageous to use this same helium gas as buffer gas and/or to allow the helium or the working gas to "leak" into the gearbox 8 (as has been illustrated schematically using arrows in FIG. 2).

By contrast, the other sealing systems on the spindle 25 can be simpler than the solutions proposed in the prior art. The overall cost of manufacture of the compressor may thus be reduced.

For preference, the helium thus sent into the mechanical gearbox 8 needs to be recuperated because losing it would reduce the economic benefit of the solution.

In order to achieve that, this helium transferred into the mechanical gearbox 8 is preferably recuperated and treated. Thus, a first oil separation system may be installed so as to limit the quantity of oil that will leave the gearbox 8 of the compressor 12. The recovered helium may contain impurities of air if the mechanical gearbox 8 is not perfectly sealed against the outside.

It is therefore necessary to make the mechanical gearbox 8 (notably containing the speed multiplication mechanism) as sealed as possible against the external environment in order to avoid excessive losses of helium to the outside.

As illustrated schematically in FIG. 1, it is therefore also preferable to provide a purification system 11 for purifying the recovered helium (line 16) so as to separate the residual oil and also purify this helium of the other contaminants (for example: air, water, etc.) so that it can be recuperated and possibly reinject (line 14) this helium into the working cycle.

Usually, the oil 9 of this mechanical gearbox is also managed by a system external to it with a tank, a pump, and injection and regulating valves.

The oil circuit in contact with the helium will also need to limit losses of helium to the outside.

The purification system 11 will preferably contain a conventional element of the mechanical filtration, coalescer, and/or adsorption type, allowing the removal of oil vapors and droplets present in the helium.

As illustrated in the example of FIG. 3, a first tapping pipe 16 recovers the mixture of gas and oil from the gearbox 8 to a purification member 111. The purification member 111 in FIG. 3 may comprise or consist of a "coalescer" making it possible to limit the amount of oil that leaves the gearbox in liquid form with direct return via a line 13. Another outlet 14 of the purification member 111 may comprise a stream that still needs to be treated for vapors and/or other impurities.

If this member 111 performs all of the purification task, the purified oil can be returned to the mechanical gearbox 8 via a second, return, pipe 13. The helium recovered during the purification is sent, for example, into the working circuit.

Figure 4:
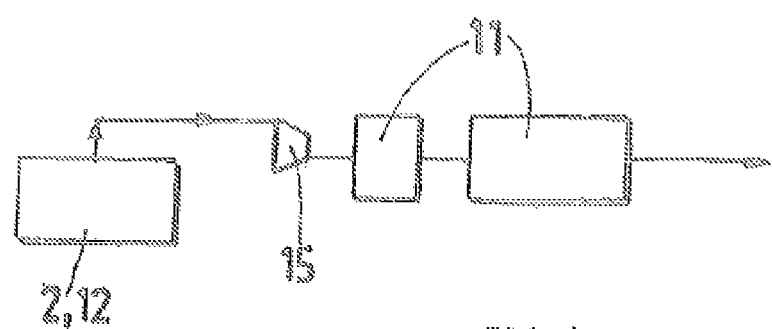
FIG. 4 depicts a schematic and partial view illustrating the structure and operation of details of another exemplary embodiment of a refrigeration and/or liquefaction device according to the invention, illustrating purification of gas of the device containing lubricating oil.

As illustrated in FIG. 4, it may be necessary to compress this helium mixed with oil recovered by the tapping pipe 16 prior to treatment (purification). A recuperation compressor 15 may be provided for this purpose upstream of the purification member 11.

According to one advantageous particular feature, if this recuperation compressor 15 is of the oil compressor type, the same oil (or a chemically compatible oil) is used for the mechanical gearboxes 8 of the compressors 12 of the compression station 2 and for the recuperation compressor 15. If this recuperation compressor 15 is a lubricated-screw type compressor, a determined oil is needed to allow better final separation of the oil and of the helium. For example, a synthetic-type oil with a low saturation vapor pressure can be used.

The purification member 11 may thus be common to the two compression systems (the compressors 12 of the station 2 and the recuperation compressor 15).

This allows standardization and a reduction in the overall cost of the device.

The device and the method thus make it possible to simplify the structure of the bearings 5. The cost of the device 1 and of the operation of same are lower. The performance of the compressor drive mechanism in the mechanical gearbox 8 is notably improved.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A method for low-temperature liquefaction and/or cooling of a working fluid comprising helium, by using a refrigerator or a liquefier comprising a working circuit provided with a compression station and with a cold box, the refrigerator or the liquefier subjecting a working gas in the working circuit to a cycle comprising, in series, the steps of:
    compressing the working fluid in the compression station;
    cooling the compressed working fluid in the cold box;
    heating of the cooled, compressed working fluid in order to return the cooled, compressed working fluid to the compression station, the compression station comprising one or more compression stages each using one or more compressors comprising a compressor impeller secured to a spindle mounted so that the compressor impeller can rotate on bearings, the spindle of each compressor being rotationally driven by an output shaft of a motor via a gear mechanism housed in a mechanical gearbox containing lubricating oil;
    controlling a gaseous atmosphere inside an internal volume of the mechanical gearbox so as to contain a gaseous mixture having a mean molar mass that is lower than a molar mass of air, the gaseous atmosphere of inside the mechanical gearbox comprising a molar proportion of helium that is greater than the molar proportion of helium in the air;
    injecting a buffer gas to at least at one bearing of the compressor or compressors to form a gas barrier; and
    guiding leaks of working fluid from the working circuit toward a collection zone, wherein at least part of the collection zone comprises the mechanical gearbox, such that a mixture of the buffer gas and the guided leaks of working fluid are fed into an internal volume of the mechanical gearbox.

2. The method of claim 1, wherein the internal atmosphere of the gear box includes a mixture of oil and the working gas and said method further comprising a step of purifying the internal atmosphere of the gearbox in order to separate the working gas and the oil and reinject the purified oil into the gearbox.

3. The method of claim 2, further comprising a step of compressing the mixture of gas and oil of the atmosphere prior to the purification step.

4. The method of claim 1, wherein the working fluid consists of pure helium.

5. The method of claim 1, wherein the working fluid consists of pure helium.

6. The method of claim 1, further comprising the step of purifying the internal atmosphere of the motor gearbox connected to said motor gearbox via a first pipe for tapping a mixture of gas and oil from the gearbox and a second pipe for returning purified oil.

7. The method of claim 6, further comprising the step of compressing the mixture tapped off by the first pipe so as to supply a purification member with a mixture compressed to a determined pressure.

8. The method of claim 1, wherein the molar proportion of helium in the gaseous atmosphere inside the mechanical gearbox is between 5% and 100%.

9. The method of claim 1, wherein the gaseous atmosphere inside the mechanical gearbox is comprised of a predominant molar proportion of helium.

10. The method of claim 1, wherein the gaseous atmosphere inside the mechanical gearbox comprises helium and at least one gas selected from the group consisting of nitrogen, argon, and one or more components of the working fluid.

11. The method of claim 1, wherein at least some of the compressors of the compression station are compressors of a centrifugal type.

12. The method of claim 1, wherein the buffer gas comprises at least one of helium, nitrogen, and one or more components of the working fluid.

* * * * *